United States Patent [19]

Thompson

[11] 4,041,606
[45] Aug. 16, 1977

[54] CHAIN SAW WITH FLEXIBLE SKID AND VIBRATION AND RESONANCE REDUCING MEANS

[75] Inventor: Stephen E. Thompson, Los Angeles, Calif.

[73] Assignee: McCulloch Corporation, Los Angeles, Calif.

[21] Appl. No.: 730,638

[22] Filed: Oct. 7, 1976

[51] Int. Cl.² .......................................... B27B 17/02
[52] U.S. Cl. ..................................................... 30/381
[58] Field of Search .................. 30/381, 382, 383, 384, 30/385, 386, 387, 379

[56] References Cited

U.S. PATENT DOCUMENTS

| | | | |
|---|---|---|---|
| 2,624,379 | 1/1953 | Arneson | 30/386 |
| 3,525,373 | 8/1970 | Kobayashi | 30/381 |
| 3,530,909 | 9/1970 | Scharpf | 30/381 |
| 3,823,474 | 7/1974 | Ionescu | 30/383 |
| 3,911,580 | 10/1975 | Bailey | 30/381 |
| 3,934,344 | 1/1976 | Inaga | 30/381 |
| 3,945,119 | 3/1976 | Nagashima | 30/383 |

*Primary Examiner*—Jimmy C. Peters
*Attorney, Agent, or Firm*—Kenway & Jenney

[57] ABSTRACT

A chain saw including a flexible, resilient skid mounted by means providing torsional and axial stress relieving action whereby enhanced vibration isolation is obtained and certain resonant vibration is eliminated.

A skid for use in a chain saw powered by a vibration inducing drive assembly. The skid has a flat portion for resting the saw on a surface, a foot rest portion, and an upwardly directed rear portion, and is connected to the remainder of the chain saw structure by a pair of attachment means. The first attachment means connects a front portion of the skid and a front handle to the drive assembly and provides for axial stress relieving relative motion between the skid and drive assembly. A second attachment means connects the upwardly directed rear portion of the skid to a rear handle and provides for torsional stress relieving relative motion between the skid and the handle.

The skid and its attachment means cooperate to reduce handle vibration, eliminate certain resonance problems, and minimize vibrationally induced creep tendencies when the chain saw is resting on the ground with its engine idling.

12 Claims, 6 Drawing Figures

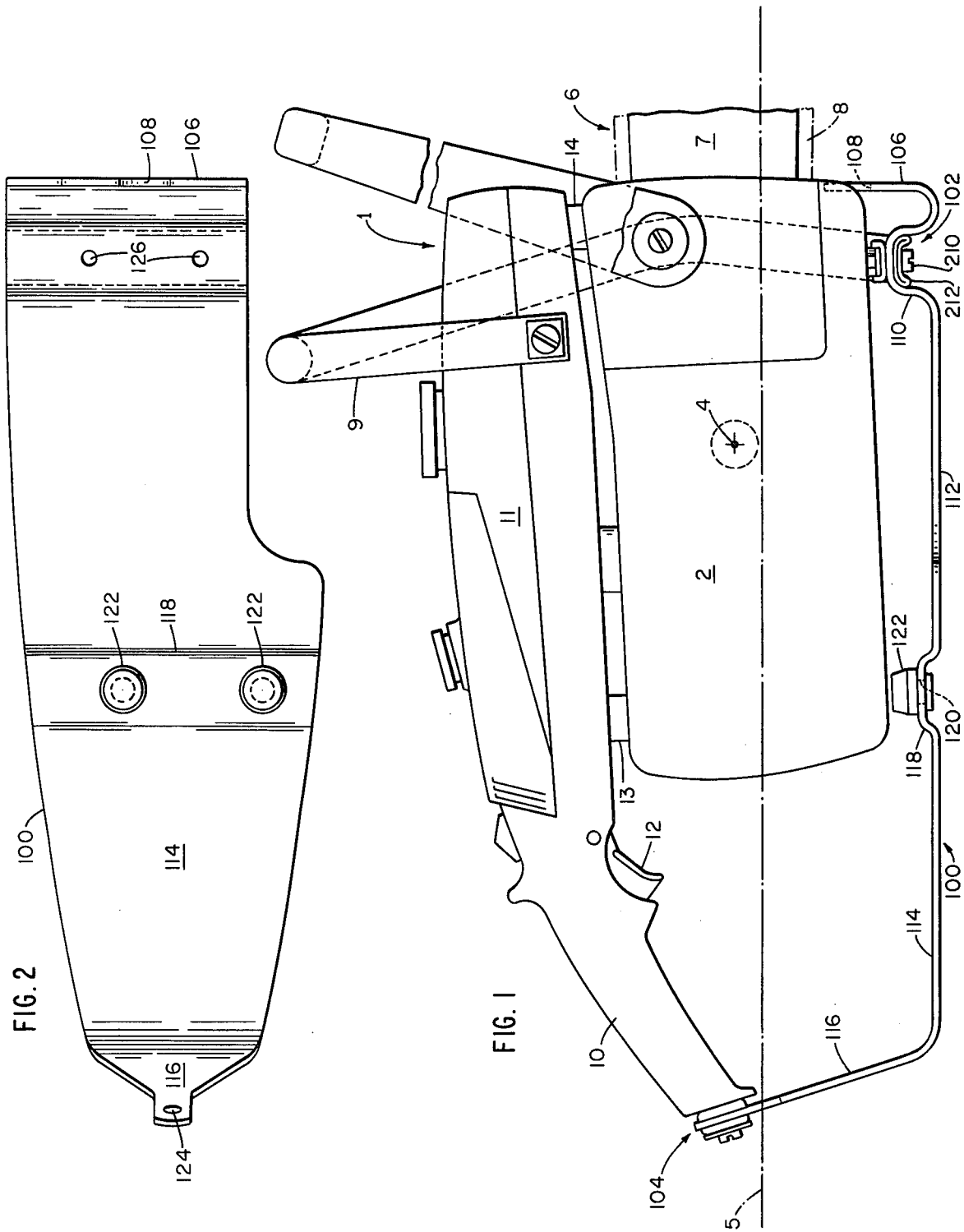

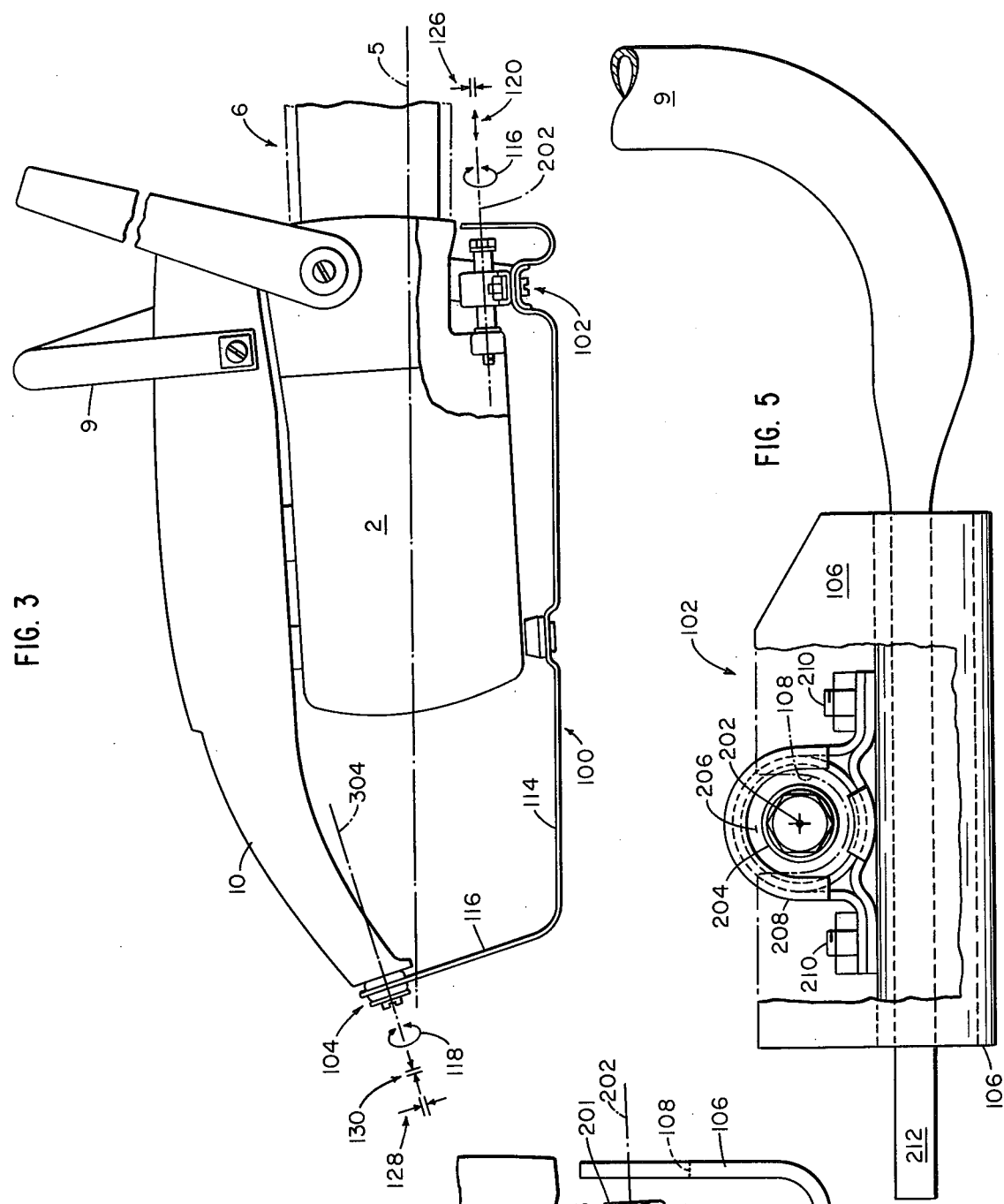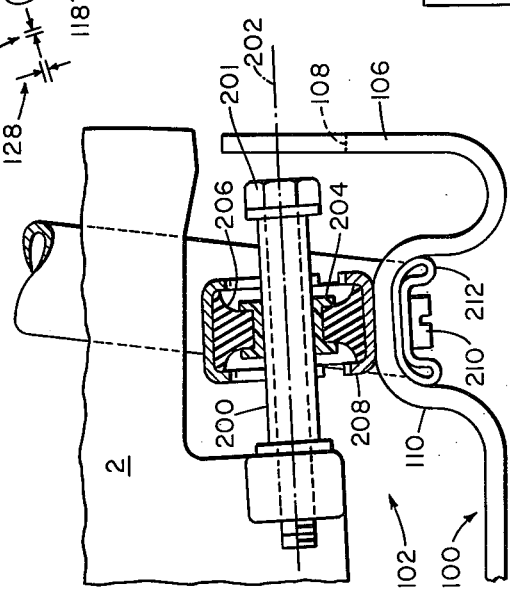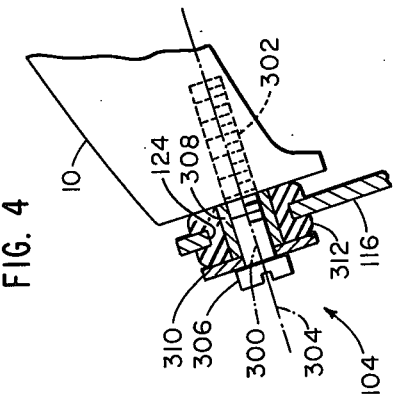

CHAIN SAW WITH FLEXIBLE SKID AND VIBRATION AND RESONANCE REDUCING MEANS

BACKGROUND, SUMMARY AND OBJECTS OF THE INVENTION

This invention relates to improvements in chain saw design and more particularly, to a novel chain saw structure comprising flexible and resilient skid and vibration isolating skid mountings which cooperate to:

1. reduce handle vibration,
2. eliminate certain resonance, and
3. reduce tendencies for the saw to creep while resting on the ground and idling.

It is well known that internal combustion engine powered chain saws tend to produce vibrations which may cause the operator of the chain saw to become somewhat fatigued. In response to this problem, vibration isolation systems have been provided which, in general, are interposed between the drive assembly of the chain saw and the handles so that vibration is reduced in the handle portions of the chain saw. Examples of such vibration isolation systems are disclosed in U.S. Pat. Nos. 3,813,766 (June 4, 1974), 3,652,074 (Mar. 28, 1972), 3,698,455 (Oct. 17, 1972) and 3,542,095 (Nov. 24, 1970), all to Frederickson et al. and U.S. Pat. Nos. 3,972,119 (Aug. 3, 1976) to Bailey.

In addition, chain saws typically have a flat surface on the bottom portion of the engine housing or other structure upon which the chain saw may be rested when not in use. If the engine is idling, vibrations may resonate through the flat surface and cause the saw to creep or "walk" to a different orientation or location.

In most chain saws of this type, the crank shaft of the engine is oriented transversly to the longitudinal, front-to-back, central axis of the saw. It is the motion of the piston, connecting rod, and crank shaft which produce vibrations which contribute to handle vibration and to "creeping" effect.

In order to reduce the magnitude of these problems and in order to achieve other significant advantages, the invention provides a novel skid and skid mounting for use with a chain saw.

A major advantage of the novel, flexible and resilient skid presented through the invention, and its integrally associated, stress relieving mounting means (affording torsional stress relief at the rear chain saw handle and axial stress relief at the front chain saw handle) entails a marked reduction in chain saw handle vibration and an elimination of certain resonance, with a consequent reduction in operator fatigue.

The skid comprises a structure which is preferably made of elastically flexible sheet material and which preferably spans the length of the chain saw drive assemly below the chain saw. The skid may have a flat portion upon which the saw may be rested, including a foot rest portion which the operator can utilize to anchor the saw while he starts the engine by pulling on a conventional starter cable. The skid is attached to a front handle, and both the skid and handle are linked to a drive assembly by a first attachment means which provies stress relieving action with respect to both the front handle and the skid. Preferably, the first attachment means includes means for providing axial stress relieving action longitudinally of the saw and resiliently cushioned radial relative movement between the drive assembly and the handle and the skid, with respect to the longitudinally extending, axial stress relieving axis.

The skid also comprises a rear portion which extends upwardly from the foot rest portion and is connected to a rear handle of the chain saw by a second attachment means which provides torsional stress relieving action between the rear handle and the skid. Preferably, the second attachment means also comprises a resilient member which provides resiliently cushioned radial and axial relative movement between the rear handle and the skid.

In a preferred embodiment of the invention, the skid is formed from a single sheet of resilient, preferably metallic, leaf spring-like material. Bumpers are interposed between the skid and the lower portion of the drive assembly, which bumpers, together with the resilient members forming the parts of the respective attachment means, provide vibration isolating skid support means and reduce resonant vibration.

The front attachment means preferably comprises a slide bar rigidly connected to the drive assembly and oriented substantially parallel to the chain saw's longitudinal axis. Resilient sliding means in the form of a rubber diaphragm is mounted for axial sliding movement on the slide bar and connected to the front handle and to the skid. The preferred construction for the second attachment means comprises a shaft connected to the rear handle of the saw and having a central axis which may be inclined with respect to the saw's longitudinal axis. A resilient annular member is mounted for axial rotation on the shaft and is connected to the upwardly extending rear portion of the skid. Furthermore, in the preferred flexible skid, the body of the springlike skid, due to its flexibility, provides a lowered spring rate and hence a lowered vibration and a reduction or elimination of resonant frequency vibration tendencies.

The rear portion of the skid and the foot rest together serve as a guard for the hand of the user and provide protection against accidental actuation of the trigger by an obstruction when the saw is set on the ground.

The novel structural concepts heretofore set forth are intended to produce, as primary objects of the invention, a chain saw structure characterized by a reduction or minimization of handle vibration and a reduction or minimization of resonant frequency vibrations in the chain saw.

An additional object of the invention is to provide a skid upon which a chain saw may be rested and which is substantially vibrationally isolated from the drive assembly of the saw such that vibration of the skid is prevented or inhibited.

Another object of the invention is to prevent vibrational creep of a chain saw, while the chain saw is resting on the ground.

Still another object is to provide structure on a chain saw which performs the multiple functions of acting as a guard for the trigger and hand of the user, acting as a foot rest for aid in starting the motor, and acting as a rest surface for placing the chain saw on the ground.

These and other objects and features of the invention will be apparent to those skilled in the art from the following detailed description of the invention and from the drawing.

DRAWINGS

FIG. 1 is a side elevation of a chain saw fitted with a structure embodying the invention illustrating its relationship to the chain saw;

FIG. 2 is a top plan view of a preferred embodiment of the skid of the invention;

FIG. 3 is a simplified side elevation of a chain saw schematically illustrating the various type of relative motion between the skid and chain saw drie assembly;

FIG. 4 is a detailed side view in cross section of the second attachment means connecting the skid to the rear handle;

FIG. 5 is a detailed front plan view of the first attachment means linking the skid and the front handle of the chain saw with the drive assembly; and FIG. 6 is a detailed side elevation view of the first attachment means of FIG. 5 showing certain parts in cross section.

DETAILED DESCRIPTION OF THE INVENTION

Before treating the improved aspects of the invention, a brief summary of the preferred chain saw context of the invention will be discussed.

PREFERRED CHAIN SAW CONTEXT OF THE INVENTION

The chain saw with which the instant invention may be used is of a type disclosed in the aforementioned United States Frederickson et al. U.S. Pat. Nos. 3,813,776 (June 4, 1974), 3,652,074 (March 28, 1972), 3,698,455 (Oct. 17, 1972), and 3,542,095 (Nov. 24, 1970), the disclosures of which are hereby incorporated by reference.

As generally set forth in these patents, a chain saw 1 comprises a vibration generating drive assembly 2 which includes a piston and connecting rod driven crank shaft (not shown) having a rotational axis generally depicted by reference number 4, and a longitudinal axis 5.

Chain saw 1 additionally includes a cutter chain means 6 comprising a guide bar 7 upon which a cutter chain 8 is slideably supported. By virtue of transmission means now well known in the art, an internal combustion engine within the drive assembly 2 serves to drivingly cooperate with the cutter chain means 6.

The chain saw features a laterally extending front handle 9 which, on one side, is attached to a fuel tank assembly 11, providing an inertia or dampening function as described in the aforesaid Frederickson et al. patents. Handle 9 extends laterally around the chain saw and may be spaced radially forward of axis 4. As shown in FIG. 1, the front handle 9 has a flattened mounting portion extending in a direction parallel to axis 4 and passing beneath the drive assembly 2 where, as is explained more fully below, it attaches to certain parts of the structure of the invention.

The chain saw further includes a rear handle 10 which extends backwardly and slightly downwardly from inertia means 11 and serves as a housing for throttle trigger 12. Vibration isolating means 13 and 14 are interposed between the top of the engine drive assembly 2 and beneath the inertia or fuel tank means 11. A general appreciation of the structure and mounting for a suitable vibration isolating means 13 and 14 may be gained by making reference to the aforementioned Frederickson et al. patents.

The foregoing description briefly discloses the preferred chain saw context of the instant invention. However, it should be understood that the invention may be used with other chain saw designs, consisting with the overall teaching of this invention.

IMPROVED STRUCTURE OF THE INVENTION

As shown in FIG. 1, a skid 100 formed from a single piece of leaf-spring, sheet-like metallic material is connected to the chain saw by a first attachment means designated 102, and a second attachment means designated 104.

The skid 100 is preferably fabricated from resilient sheet metal such as aluminum (or possibly steel) but may be cast from metal or plastic. It comprises a front shield portion 106 which has a cut-out 108 allowing access to the front attachment means 102, an inverted channel portion 110 for receiving the bottom portion of front handle 9, a flat portion 112 upon which the chain saw may be rested, a foot rest portion 114 located below the rear handle 10 and to the rear of drive assembly 2, and an upwardly extending rear portion 116 which connects foot rest portion 114 to attachment means 104.

As seen in FIGS. 1 and 2, the skid has a second channel portion 118 defining a pair of holes 120 which accept shock absorbing and anti-rattling buttons or snubbers 122. A preferred structure for such buttons or snubbers is disclosed in the aforementioned U.S. Pat. No. 3,652,074 to Frederickson et al.

As illustrated in FIG. 2, the uppermost section of the rear portion 116 of the skid 100 has a hole 124 for receiving certain parts of second attachment means 104. Also, the inverted channel portion 110 has a pair of holes 126 for securing first connection means 102 thereto.

As can be seen from FIG. 2 the lateral dimensions of skid 100 may be varied to match the contours of the other parts of the chain saw for aesthetic and desired elasticity considerations. However, skid 100 must have sufficient width such that it can support the chain saw when rested on the ground without tipping and effectively shield the operators hand and the throttle zone. Preferably, skid portion 114 is substantially as wide as engine assembly 2 and considerably wider than handle 10. The thickness of the skid and the elasticity thereof will be selected to provide a leaf-spring action.

Rear portion 116 and foot rest 114 together function as a hand guard to prevent contact between the hand of the chain saw operator and brush, etc., during use. Further, rear portion 116 and foot rest 14 provide protection against accidental actuation of the throttle triger 112 by warding off possible interfering objects as are often encountered in wooded areas.

From FIG. 3, the various relative movements between the skid 100 and the drive assembly 2 can be readily appreciated. To minimize handle vibration and vibration induced creep, it is believed to be important to isolate axial vibrations (indicated by arrow 120) from the front of the skid and torsional vibrations (indicated by arrow 118) from the rear of the skid. Moreover, with the structure herein described, radial vibrations at the front and rear of the skid of a lateral or vertical nature (indicated by arrows 126 and 128) will be restrained, as will axial stress indicated by arrow 130 at the rear of the skid and torsional stress indicated by arrow 116 at the skid front end, to the extend that it should be present.

First and second attachment means 102 and 104, as will become apparent from the detailed description set forth below, are specially designed to inhibit transmission of these variously directed vibrations, generated in the drive assembly and transmitted from the drive assembly to the skid.

In addition, the skid 100 can act as a leaf spring of desired elasticity operating in series with resilient members in the attachment means to reduce vibration and resonance. While, the optimum skid material is flexible it retains overall structural integrity, and operates to reduce overloading of the shock mounts 13 and 14 when the chain saw is being manipulated.

Axial vibration of the drive assembly causes relative movement in the directions of arrow 120 between the front of the skid and the front of engine assembly 2. Such axial vibration is largely dissipated and transmitted only slightly by friction between the skid and the front handle and engine assembly. Any axial vibration transmitted to the skid despite the stress relieving action of attachment means 102 is further absorbed as a consequence of the flexibility of the skid.

The generally free, axial sliding, stress relieving action of the components of front mount 102 serves another significant function. This freedom of axial movement, generally longitudinally of the chain saw, allows an axial stress relieving elastomeric diaphragm in mount 102 to remain relatively unstretched in an axial direction, when the saw is working. This serves to maintain the spring constant of the diaphragm at a desirably low level. This phenomena is believed to be particularly important during "bucking" and is believed to materially contribute to a reduction in vibration acceleration to below a "2G" level.

Attachment means 102 and 104 should preferably be designed to provide some degree of resiliently cushioned radial shock absorbing action between the skid and chain saw structure, in relation to radial vibrations depicted by arrows 126 and 128.

Lastly, it is also advisable to include structure in attachment means 104 to provide some resiliently cushioned axial stress relieving action between the rear handle 10 and the rear skid portion 116, in relation to axial stress 130.

The foregoing requirements are met by the inclusion of attchment means constructed as follows.

Referring to FIGS. 5 and 6, the front attachment means 102 is shown in detial.

As shown in FIGS. 5 and 6, mount 102 may comprise a slide bar or tube 200 rigidly mounted on drive assembly 2 by a bolt 201 and having a central axis 202 extending longitudinally of axis 5 of the chain saw 1. A nylon bushing 204 may be freely journaled and slide mounted on slide bar 200 and forms an annular socket for an annular rubber diaphragm 206. Diaphragm 206 may conform generally to the diaphragm structures featured in FIG. 2 of Frederickson et al. U.S. Pat. No. 3,813,776.

As can be seen in FIG. 6, the diaphragm, in cross section, may have a flared configuration which tapers outwardly. Diaphragm 206 and bushing 204 together comprise a relatively unrestrained slider means. A two part, annular case 208 supports the outer periphery of the slider means and connects it through bolt 210 to the inverted channel portion 110 of skid 100. Bolts 210 pass through skid holes 126, and through aligned holes of the flattened portion 212 of tubular front handle 9. In a modification of attachment means 102, a generally cylindrical steel ring (not shown) may circle and be bonded to the outer periphery of the diapgragm 206, as depicted in Frederickson et al U.S. Pat. No. 3,813,776.

As will be appreciated from the foregoing, this construction provides multiple degrees of relative movement or stress relieving capability between the skid 100, handle 9, and the engine assembly 2, as generally depicted by the arrows 116, 120, and 126, the primary freedom of action involving free axial movement 120 and resiliently cushioned radial movement 126.

Referring to FIG. 4, a cross section detail of the second attachment means 104 is shown.

A shaft 300 of mount 104 may be threaded into a bore 302 in the end of handle 10 and has a central axis 304 and an enlarged end 306. A sleeve 308, coaxial with shaft 300, may be journaled on the shaft and thus be rotatably mounted thereon. A washer 310 may rest against the inward side of enlarged end 306 and abuts sleeve 308. A generally annular resilient rubber member 312 may be provided which forms a grommet, surrounding sleeve 308 and thereby rotatably journaled on shaft 300. In this connection, sleeve 308 prevents significant axial "squeezing"of grommet 312. Member 312 may be restrained from axial translation by a washer 310 and the end of handle 10. Resilient member 312 is journaled within the interior of the skid hole 124 and thereby is connected to rear portion 116 of skid 100.

From the foregoing it can be seen that in response to torsional vibration in handle 10, the shaft 300 can rotate within the grommet 312, thus providing torsional stress relieving action between the skid and drive assembly. Furthermore, the resilience of rubber grommet 312 provides resiliently cushioned radial (illustrated by arrows 128) and axial (arrows 130) stress relieving, relative movement between the parts interconnected by attachments means 104.

In operation, the operator rests the saw on flat portion 112, places his foot on foot rest 114, and starts the engine of the chain saw by pulling on a starter cable (not shown). With one hand on handle 9 and the other on handle 10, the user depresses throttle trigger 12, thereby actuating chain cutting means 6. During use, rear portion 116 and foot rest 114 together protect the hand of the user from contact with interferring brush. When the chain saw is put down, it is again rested on flat portions 112-114 of skid 100 and may be left idling with very little "walking" or "creeping" along the ground occurring due to vibrations in the drive assembly 2. The resilient rubber grommet 312 of second attachment means 104, the rubber bumpers 122, and the rubber diaphragm 206 of first attachment means 102, and the rubber diaphragm 206 of first attachment means 102, and in particular the torsional stress relief of rear mount 104 and the axial stress relief of front mount 102 reduce handle vibrations and resonance tendencies.

The provision of attachment means 104, with its associated torsional stress relieving action, allows rotary motion of the handle about the axis 304 of shaft 300. This is believed to substantially eliminate a torsional resonance vibration in handle 10. In addition, the flexibility of skid 100 is believed to be responsible for a significant reduction in vibration transmitted from the power head 2 to the handle assembly.

Summary of Major Advangages Overall Scope, and Unobviousness of the Invention.

In describing the invention, various advantages aspects have been delineated.

Primary advantages of the flexible skid and stress relieving skid mount invention reside in a reduction in handle vibration and an elimination of certain resonance.

The leaf-spring resilient flexibility of skid 100 advantageously eliminates certain resonance that would be present in rigid skid structures and reduces vibration transmission.

The freedom of axial movement of radial stress relieving diaphragm 206 operates to maintain a desirable, low spring rate characteristic in vibration isolating unit 102.

Another major advantage of the invention is believed to reside in the cooperation of the two attachment means 102 and 104, with rear attachment 104 providing a significant degree of torsional stress relieving action or torsional "decoupling" between handle 10 and skid 110. This "decoupling" is believed to eliminate certain resonance and handle vibration.

Other advantages of the invention are believed to reside in the basic simplicity and ease of fabrication of the skid and vibration isolation system.

In addition, the invention advantageously provides a guard for the hand of the user during operation of the saw, a foot rest to facilitate chain saw starting, and a trigger guard which protects against accidental actuation of the throttle trigger by an obstruction when the saw is set on the ground.

The flexibility of the skid and the axial and radial stress relieving and/or vibration isolating actions of the skid attachments are also deemed to be both collectively and individually noteworthy in relation to their vibrations and/or shock and/or rattle isolating and minimizing tendencies.

Significantly, the overall advantages outlined above are achieved through a marked departure from such prior art teachings as those exemplified by United States Nagashima et al. U.S. Pat. No. 3,945,119 March 23, 1976). Such prior art wholly fails to disclose or suggest the torsional and axial freedom of action provided respectively, by the attachments 104 and 102 of the present invention or the flexible, broad skid concept of this invention.

As will be apparent, advantages such as those summarized above may be achieved through configurations and arrangements differing from the disclosed and preferred embodiment.

For example, the slider means 204, 206 might be carried by the power head 2, with slide mount 200 being carried by the front handle/skid combinations.

In addition, grommet 312 might be carried by handle 10, with skid 100 supporting a grommet shaft akin to means 300/308.

Thus, those skilled in the chain saw vibration isolating art and familiar with this disclosure will readily envision additions, deletions, substitutions, reversals, or other modifications with respect to the disclosure heretofore set forth, all of which fall within the perview of the invention as set forth in the appended claims.

I claim:

1. A structure for use in a chain saw, which chain saw includes
    a vibration inducing drive assembly,
    a fuel tank assembly above said drive assembly,
    vibration isolating means between said drive assembly and said fuel tank assembly,
    a front handle connected to said fuel tank assembly, and
    a rear handle connected to said fuel tank assembly
said structure comprising
    an elastically flexible skid,
    first attachment means connecting said skid to said drive assembly and said front handle; and
    said first attachment means being operable to provide axial stress relieving action between said skid and said drive assembly and front handle;
    second attachment means connecting said skid to said rear handle;
    said second attachment means being operable to provide torsional stress relieving action between said skid and said rear handle;
said structure being operable to
    reduce handle vibration,
    reduce resonance, and
    inhibit vibrational creep of said chain saw when said skid is rested on a surface and the drive assembly is idling.

2. The structure of claim 1 wherein
    said skid is made of resilient, leaf spring material.

3. The structure of claim 1 wherein said first attachment means comprises
    slide means rigidly connected to said drive assembly and having an axis extending generally longitudinally of said chain saw, and
    sliding means mounted for axial sliding motion relative to said slide means and connected to said front handle and to said skid, said first attachment means thereby providing for relative axial movement between said skid and said drive assembly.

4. The structure of claim 3 wherein said sliding means includes a resilient diaphragm providing generally radial, stress relieving action between said drive assembly and said skid.

5. The structure of claim 3 wherein said second attachment means comprises
    shaft means connected to said rear handle and having a central axis extending generally longitudinally of said chain saw, and
    a member mounted for rotation on said shaft and connected to said skid and operable to provide rotary, stress relieving action between said skid and said rear handle.

6. The structure of claim 5 wherein said member comprises annular resilient means, and
    provides resiliently cushioned radial and axial relative movement between the skid and said rear handle.

7. The structure of claim 5 wherein said structure includes
    resilient shock absorbing means interposed between the underside of said drive assembly and an upper surface of said skid.

8. The structure of claim 7 wherein
    said rear handle includes a throttle trigger for actuating said chain saw; and
    said skid comprises a trigger protecting portion located below said throttle trigger and extending laterally beyond said rear handle.

9. A structure for reducing handle vibration and resonance and for inhibiting vibrational creep of a chain saw, which chain saw has
    a vibration inducing drive assembly,
    a front handle, and
    a rear handle,
said structure comprising
    a skid of resiliently flexible material having
        a base portion for supporting the chain saw on a surface,
        a foot rest portion, and
        an upwardly directed rear portion extending between said foot rest portion and said rear handle;

first attachment means connecting said drive assembly and said base portion comprising means for providing stress relieving, relative movement between said skid and drive assembly; and second attachment means connecting said upwardly directed rear portion of said skid to said rear handle, said second attachment means comprising means for providing stress relieving relative movement between said skid and drive assembly.

10. The structure of claim 9 wherein said skid comprises resilient leaf spring material.

11. The structure of claim 10 wherein said first attachment means including means for providing axial stress relieving, relative motion between said skid and said drive assembly, and front handle;

said skid is operable to absorb vibration components transmitted thereto longitudinally of said chain saw by resilient flexing action; and said second attachment means includes means for providing torsional stress relieving, relative motion between said skid assembly and said rear handle.

12. A structure for reducing handle vibration and resonance and for inhibiting vibrational creep in a chain saw, which chain saw has a vibration inducing drive assembly, a front handle, and a rear handle, said structure comprising an elastically resilient leaf spring skid;

a first stress relieving attachment means connecting said skid to said front handle; and a second, stress relieving attachment means connecting said skid to said rear handle;

said first and second stress relieving attachment means and the elastic resilience of said leaf spring cooperating to reduce handle vibrations, reduce resonance, and inhibit vibrational creep of said chain saw when said skid is rested on a surface and the drive assembly is idling.

* * * * *